United States Patent [19]

Barsotti

[11] Patent Number: 5,376,704
[45] Date of Patent: * Dec. 27, 1994

[54] WATER-BORNE COATING COMPOSITIONS COMPRISING HALF ESTERS OF ANHYDRIDE POLYMERS CROSSLINKED BY EPOXIES

[75] Inventor: Robert J. Barsotti, Franklinville, N.J.

[73] Assignee: E. I. du Pont de Nemours and Company, Wilmington, Del.

[*] Notice: The portion of the term of this patent subsequent to Nov. 22, 2011 has been disclaimed.

[21] Appl. No.: 977,863

[22] Filed: Nov. 17, 1992

[51] Int. Cl.$^5$ .................. C08G 59/42; C08L 63/00; C08L 43/00; C08L 31/06
[52] U.S. Cl. .................. 523/414; 523/439; 525/117
[58] Field of Search .............. 523/414, 439; 525/117

[56] References Cited

U.S. PATENT DOCUMENTS 4,247,439 1/1981 Matthews ..................... 523/414
4,600,737 7/1986 Georgalas ..................... 523/414
4,871,806 10/1989 Shalati ..................... 525/117
4,906,677 3/1990 Barsotti ..................... 523/439

FOREIGN PATENT DOCUMENTS 353734 7/1990 European Pat. Off. .
450963 9/1991 European Pat. Off. .

Primary Examiner—John C. Bleutge
Assistant Examiner—D. R. Wilson
Attorney, Agent, or Firm—Chris P. Konkol

[57] ABSTRACT

An aqueous coating composition useful for a finish for automobiles and trucks in which the film forming binder comprises a neutralized half-ester product of an acrylic polymer having at least two reactive anhydride groups and an epoxy-containing, optionally silane-containing crosslinker. The composition may be used as a multi-package system. The composition is characterized by improved environmental resistance and excellent clarity and appearance, particularly for clearcoats.

14 Claims, No Drawings

WATER-BORNE COATING COMPOSITIONS COMPRISING HALF ESTERS OF ANHYDRIDE POLYMERS CROSSLINKED BY EPOXIES

FIELD OF THE INVENTION

This invention is related to a multi-component waterborne coating composition comprising a half-ester of an anhydride polymer and an epoxy crosslinking agent.

BACKGROUND

There are a wide variety of multi-component coating compositions available for finishing automobiles and trucks. Various coating compositions comprising anhydride or epoxy containing compositions are known. For example, U.S. Pat. No. 4,906,677 discloses a composition comprising an acrylic anhydride polymer, a glycidyl component, and a phosphonium catalyst. U.S. Pat. No. 3,136,736 and British patent 994,881 disclose coating compositions comprising polyepoxides and maleic anhydride copolymers. U.S. Pat. No. 4,732,791 concerns a coating composition comprising a polyepoxide, a monomeric anhydride curing agent, and a hydroxyl containing polyfunctional polymer.

U.S. Pat. No. 4,906,677, in column 4, lines 40–47, discloses that anhydride polymers, in epoxy-anhydride compositions, may be converted to a half-ester by alcohol solvents.

European Patent Application, publication No. 0 353 734 A2, published 07.02.90 and European Patent Application, publication No. 0 450 963 A1, published 09.10.91 both disclose the combination of a polymer having a half-esterified acid anhydride group and a compound having an epoxy group and a hydroxy group, or a separate epoxy and hydroxy compound. These patents teach that, in such compositions, curing results from the half-esterified acid anhydride groups being ring-closed at curing temperatures to produce acid anhydride groups which then react with hydroxyl groups, which in turn release carboxyl groups which then react with the epoxy groups. These patents indicate that a certain hydroxy equivalent number or hydroxy value is necessary for adequate water resistance of the coating composition.

The afore-mentioned EP 0 353 734 A2 states that water can be used as a "diluent" if the carboxyl groups are neutralized with an amine. In contrast, the present invention is directed to compositions in which water is employed as the primary carrier, organic solvents being possible diluents. The afore-mentioned EP 0 450 963 A1 states that the half esterified polymer may be neutralized with amines to make a hydrophilic polymer which can form an aqueous composition. The examples, however, all disclose compositions which employ organic solvents.

A problem with present coating compositions for automobiles and trucks, or parts thereof, is that durability is not as good as desired. An important aspect of durability is environmental etch resistance. The present invention offers a high quality finish exhibiting superior environmental resistance at lower cost. In particular, the present invention is directed to an etch-resistant waterborne finish which is dramatically superior in this regard to conventional waterborne finishes.

The present composition is a two-package system, having use in both original equipment manufacture. The half-ester is converted back to an anhydride, for reaction with the epoxy crosslinker during baking and curing at the elevated temperatures at which cars, trucks, parts thereof, and the like are finished. Such a coating composition exhibits excellent clarity, appearance and environmental resistance. Importantly, such compositions offer a low VOC (volatile organic content) since the binder is waterborne employing an aqueous (primarily water) carrier.

SUMMARY OF THE INVENTION

The present invention is directed to a coating composition containing 20–80% by weight of binder components and 80–20% by weight of an aqueous carrier. The binder contains (a) a half-ester of an anhydride polymer having at least two anhydride groups and having a weight average molecular weight of about 2,000–100,000;

(b) an epoxy component having at least two reactive glycidyl groups; and (c) a basic compound for neutralizing the half-ester polymer in (a);

wherein the water content of the aqueous carrier is greater than 60 percent by weight of the aqueous carrier.

Optionally, these compositions may also include epoxy-silane polymers, silane polymers, acid polymers, lower weight polyesters or polyester urethanes, melamine resins, hydroxy polymers, acrylic latices, waterborne urethane emulsions or dispersions, or mixtures thereof.

The invention also includes a process for coating a substrate with the above coating composition.

DETAILED DESCRIPTION OF THE INVENTION

The composition of the present invention forms a durable environmental resistant coating. The composition is especially useful for maintenance coatings for architectural structures and for finishing the exterior of automobiles and trucks.

The composition can also be pigmented to form a colored finish, although the composition is particularly useful as a clearcoat.

Preferably, the coating composition has a high solids content and contains about 20–80% by weight binder and 20–80% by weight aqueous carrier. The binder of the composition contains about 25–90%, preferably 35 to 65% (by weight of binder) of the half-ester of an anhydride polymer containing at least two anhydride groups; 5–50%, preferably 15 to 30% (by weight of binder) of a glycidyl or epoxy containing component.

Optionally, the composition may comprise 5–50%, preferably 10 to 25% by weight of binder of an acrylic or a polyester or polyester urethane which may contain hydroxyl and/or acid functionality. If acid functional, the acid number is 20 to 120. If hydroxy functional, the hydroxy number is 20 to 120. In one embodiment of the invention, the ratio of hydroxy groups to half-esterified anhydride groups is less than 0.1 so that co-reacts for tying up the hydroxy group are not needed. However, hydroxy groups, while they can be tolerated, are not needed for curing.

In the present composition, if an optional acrylic or polyester or polyester urethane polymer is acid functional, then the cure occurs between the acid groups and the epoxy groups and the half-ester groups, following ring-closure during baking, and the epoxy group. Some cure may also occur between the acid of the half ester and the epoxy. The main cure, however, is based on the ring closure during baking.

The anhydride polymer employed in preparing the present composition has a weight average molecular weight of about 2,000–100,000, determined by gel permeation chromatography using polymethyl methacrylate as a standard. Preferably the anhydride polymer has a weight average molecular weight of 3,000–50,000.

The anhydride polymer may be prepared by conventional techniques in which the monomers, solvent, and conventional catalysts such as t-butyl perbenzoate are charged into a polymerization vessel and heated to about 75°–200° C. for about 0.5–6 hours to form the polymer.

The anhydride acrylic polymer is preferably an acrylic copolymer formed by polymerizing a mixture of monomers comprising alkyl methacrylates and/or alkyl acrylates, where the alkyl groups have 1–12 (preferably 1–8) carbon atoms, and ethylenically unsaturated anhydrides (or ethylenically unsaturated dicarboxylic acids which are converted to the acid anhydride during the polymerization). Optionally, the anhydride acrylic polymer can contain other components such as styrene, methyl styrene, acrylonitrile, and/or methacrylonitrile in amounts of about 0.1–50% by weight.

Typical alkyl acrylates and methacrylates that can be used to form the anhydride acrylic polymer are methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate, and the like, or any others mentioned below. Other components that can be used to form the anhydride acrylic polymer are acrylamide, methacrylamide, and acrylo alkoxy silanes such as gamma-methacryloxyl propyl trimethoxy silane. Also, the anhydride acrylic polymer can contain about 0.1–5% by weight of an ethylenically unsaturated acid such as acrylic acid, methacrylic acid, itaconic acid, maleic acid, and the like.

Typically useful ethylenically unsaturated anhydrides are itaconic anhydride, maleic anhydride, isobutenyl succinic anhydride, and the like. As stated above, it is also possible to impart the anhydride functionality to the anhydride acrylic polymer by using an ethylenically unsaturated dicarboxylic acid which converts to the acid anhydride during the reaction. Suitable ethylenically unsaturated dicarboxylic acids that can be used are itaconic acid, maleic acid, isobutenyl succinic acid, and the like.

A preferred anhydride acrylic polymer comprises styrene, butyl methacrylate, butyl acrylate, and itaconic anhydride. Another preferred polymer comprises methyl methacrylate, butyl acrylate, and itaconic anhydride. Another preferred polymer comprises styrene, isobornyl methacrylate, butyl acrylate, and maleic anhydride.

The anhydride polymer is half-esterified with an alcohol. Suitable alcohols include methanol, ethanol, propanol, butanol; ethyleneglycol monoalkyl ether, dialkylaminoethanol, in which particularly common alkyl groups are methyl and ethyl; acetol, allyl alcohol, propargyl alcohol, tetrahydrofurfuryl alcohol; and the like. The reaction to produce the half-ester is generally at ambient or elevated temperatures, suitably in the range of 20° to 150° C. Such a reaction may be conducted in the presence of a catalyst, for example, tertiary amines such as triethylamine, quaternary ammonium salts such as benzyltrimethyl ammonium chloride, and the like.

For utility in the aqueous carrier, the anhydride polymer, after it is converted to the half-ester, is neutralized with a base. Suitable bases include amines which are volatile under the conditions of cure. Typical amines are triethyl amine, trimethyl amine, ammonia, and dimethyl ethanolamine. Other bases are potassium hydroxide, sodium hydroxide and the like. The base is suitably used in the amount of 0.1 to 10 percent by weight of the binder.

The epoxy component preferably contains at least two glycidyl groups and can be an oligomer or a polymer. Typical glycidyl components are sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A, di- and polyglycidyl esters of acids, polyglycidyl ethers of isocyanurates, such as Denecol EX301 ® from Nagase. Sorbitol polyglycidyl ethers, such as DCE-358 ® from Dixie Chem. Co., and di- and polyglycidyl esters of acids, such as Araldite CY-184 ® from Ciba-Geigy or XUS-71950 ® from Dow Chemical form high quality finishes. Cycloaliphatic epoxies such as CY-179 ® from Ciba-Geigy may also be used.

Glycidyl methacrylate or acrylate containing acrylic polymers can be used, such as random and block polymers of glycidyl methacrylate/butyl methacrylate. The block polymers can be prepared by anionic polymerization or by group transfer polymerization.

Optionally, the composition may further comprise a copolymer having both epoxy and alkoxy silane groups, prepared as the reaction product of epoxy monomers such as glycidyl methacrylate and silane monomers as described below.

Optionally the present composition may comprise a silane polymer as a separate additional ingredient or component. Such silane polymers may suitably have a weight average molecular weight of about 1000–30,000, a number average molecular weight of about 500–10,000. (All molecular weights disclosed herein are determined by gel permeation chromatography using a polystyrene standard.)

A suitable silane polymer is the polymerization product of about 30–95% by weight ethylenically unsaturated non-silane containing monomers and about 5–70% by weight ethylenically unsaturated silane containing monomers, based on the weight of the organosilane polymer. Suitable ethylenically unsaturated non-silane containing monomers are alkyl acrylates, alkyl methacrylates and any mixtures thereof, where the alkyl groups have 1–12 carbon atoms, preferably 3–8 carbon atoms.

Suitable alkyl methacrylate monomers used to form an organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to alkyl acrylates or methacrylates, other non-silane-containing polymerizable monomers, up to about 50% by weight of the polymer, can be used in an acrylosilane polymer for the purpose of achieving the desired physical properties such as hardness, appearance, mar resistance, and the like. Exemplary of such other monomers are styrene, methyl styrene, acrylamide, acrylonitrile, methacrylonitrile, and the like. Styrene can be used in the range of 0–50% by weight.

A suitable silane containing monomer useful in forming an acrylosilane polymer is an alkoxysilane having the following structural formula:

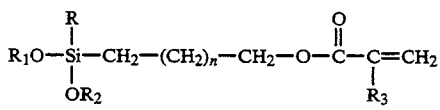

wherein R is either $CH_3$, $CH_3CH_2$, $CH_3O$, or $CH_3CH_2O$; $R_1$ and $R_2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyltrimethoxy silane and the methacrylatoalkoxy silanes, such as gammamethacryloxypropyltrimethoxy silane, and gamma-methacryloxypropyltris(2-methoxyethoxy) silane.

Other suitable alkoxy silane monomers have the following structural formula:

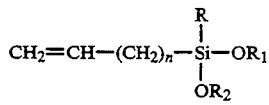

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane.

Other suitable silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Of course, mixtures of the above-mentioned silane-containing monomers are also suitable.

Consistent with the above mentioned components of the silane polymer, an example of an acrylosilane polymer useful in the coating composition of this invention may contain the following constituents: about 15–25% by weight styrene, about 30–60% by weight methacryloxypropyltrimethoxy silane, and about 25–50% by weight trimethylcyclohexyl methacrylate.

One preferred acrylosilane polymer contains about 30% by weight styrene, about 50% by weight methacryloxypropyltrimethoxy silane, and about 20% by weight of nonfunctional acrylates or methacrylates such as trimethylcyclohexyl methacrylate, butyl acrylate, and iso-butyl methacrylate and any mixtures thereof.

Silane functional macromonomers also can be used in forming the silane polymer. These macromonomers are the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above mentioned silane functional macromonomers are those having the following structural formula:

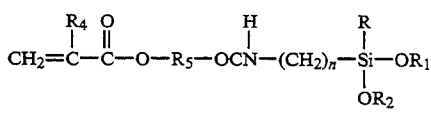

wherein R, $R_1$, and $R_2$ are as described above; $R_4$ is H or $CH_3$, $R_5$ is an alkylene group having 1–8 carbon atoms and n is a positive integer from 1–8.

Curing catalysts for catalyzing the crosslinking between silane moieties of a silane polymer and/or between silane moieties and other components of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art. Tertiary amines and acids or combinations thereof are also useful for catalyzing silane bonding. A plurality or mixture of such cure catalysts can be employed.

As indicated above, the binder of the present composition may comprises from about 5 to 50%, preferably 10 to 25%, based on the weight of the binder, of an acrylic or polyester or polyester urethane or copolymer thereof having a hydroxy number of about 20 to 120, preferably 70 to 100, or an acid number of about 20 to 120, preferably 75 to 95. This polymer has a weight average molecular weight of about 2,000 to 20,000, preferably 4,000–10,000. Unless otherwise indicated, all molecular weights mentioned herein are measured using gel permeation chromatography using polymethyl methacrylate as a standard.

Polyester urethanes are a reaction product of a hydroxyl terminated polyester component and a polyisocyanate component, preferably, an aliphatic or cycloaliphatic diisocyanate. A polyester, which may be used alone or as a component of the polyester urethane, may be suitably prepared from linear or branched chain diols, including ether glycols, or mixtures thereof or mixtures of diols and triols, containing up to and including 8 carbon atoms, or mixtures of such diols, triols, and polycaprolactone polyols, in combination with a dicarboxylic acid, or anhydride thereof, or a mixture of dicarboxylic acids or anhydrides, which acids or anhydrides contain up to and including 12 carbon atoms, wherein at least 75% by weight, based on the weight of dicarboxylic acid, is an aliphatic dicarboxylic acid.

Representative saturated and unsaturated polyols that can be reacted to form a polyester include alkylene glycols such as neopentyl glycol, ethylene glycol, propylene glycol, butane diol, pentane diol, 1,6-hexane diol, 2,2-dimethyl- 1,3-dioxolane-4-methanol, 1,4-cyclohexane dimethanol, 2,2-dimethyl 1,3-propanediol, 2,2-bis(hydroxymethyl)propionic acid, and 3-mercapto-1,2-propane diol. Preferred are 1,6-hexanediol and butylene glycol.

Polyhydric alcohols, having at least three hydroxyl groups, may also be included to introduce branching in the polyester. Typical polyhydric alcohols are trimethylol propane, trimethylol ethane, pentaerythritol, glycerin and the like. Trimethylol propane is preferred, in forming a branched polyester.

Polycaprolacone polyols may be also be used in making the polyester. A preferred polycaprolactone, a triol, is Tone® FCP 310 (available from Union Carbide).

The carboxylic acids used in making the polyester component of the polyester urethane include the saturated and unsaturated polycarboxylic acids and the derivatives thereof. Aliphatic dicarboxylic acids that can be used to form the polyester are as follows: adipic acid, sebacic acid, succinic acid, azelaic acid, dodecanedioic acid, 1,3 or 1,4-cyclohexane dicarboxylic acid and the like. A preferred acid is adipic acid. Aromatic polycarboxylic acids include phthalic acid, isophthalic acid, terephthalic acid, and the like. Anhydrides may also be used, for example, maleic anhydride, phthalic anhydride, trimellitic anhydride, and the like.

Typical polyisocyanates that may be used to form the polyester urethane are as follows: isophorone diisocyanate which is 3-isocyanatemethyl-3,5,5-trimethyl- cyclohexyl-isocyanate, propylene- 1,2-diisocyanate, butylene- 1,2-diisocyanate, butylene- 1,3-diisocyanate, hexamethylene diisocyanate, methyl-2,6-diisocyanate, methyl-2,6-diisocyanate caproate, octamethlyene diisocyanate, 2,4,4-trimethylhexamethylene diisocyanate, nonamethylene diisocyante, 2,2,4-trimethylhexamethylene diisocyanate, decamethylene diisocyanate, 2,11-diisocyano-dodecane and the like, meta-phenylene diisocyanate, para-phenylene diisoxyanate, toluene-2,4-diisocyanate, toluene-2,6-diisocyanate, xylene-2,4-diisocyanate, xylene-2,6-diisocyanate, dialkyl benzene diisocyanates, such as methylpropylbenzene diisocyanate, methylethylbenzene diisocyanate, and the like: 2,2'-biphenylene diisocyanate, 3,3'-biphenylene diisocyanate, 4,4'-biphenylene diisocyanate, 3,3'-dimethyl-4,4'-biphenylene diisocyanate, and the like; methylene-bis(4-phenyl isocyanate), ethylene-bis(4-phenyl isocyanate), isopropylidene-bis(4-phenyl isocyanate), butylene-bis(4-phenylisocyanate), and the like; 2,2'-oxydiphenyl diisocyanate, 3,3'-oxydiphenyl diisocyanate, 4,4'-oxydiphenyl diisocyanate, 2,2'-ketodiphenyl diisocyanate, 3,3'-ketodiphenyl diisocyanate, 4,4'-ketodiphenyl diisocyanate, 2,2'-thiodiphenyl diisocyanate, 3,3'-thiodiphenyl diisocyanate, 4,4'-thiodiphenyl diisocyanate, and the like; 2,2'-sulfonediphenyl diisocyanate, 3,3'-sulfonediphenyl diisocyanate, 4,4'-sulfonediphenyl diisocyanate, and the like; 2,2,-methylene-bis(cyclohexyl isocyanate), 3,3'-methylene-bis(cyclohexyl isocyanate), 4,4'-methylene-bis(cyclohexyl isocyanate), 4,4'-ethylene-bis( cyclohexyl isocyanate), 4,4'-propylene-bis-(cyclohexyl isocyanate), bis(paraisocyano-cyclohexyl)sulfide, bis(para-isocyano-cyclohexyl)sulfone, bis(para-isocyano-cyclohexyl)ether, bis(para-isocyano-cyclohexyl)diethyl silane, bis(para-isocyano-cyclohexyl)diphenyl silane, bis(para-isocyano-cyclohexyl)ethyl phosphine oxide, bis(para-isocyano-cyclohexyl)phenyl phosphine oxide, bis(para-isocyano-cyclohexyl)N-phenyl amine, bis(para-isocyano-cyclohexyl)N-methyl amine, 3,3'-dimethyl-4,4'-diisocyano biphenyl, 3,3'-dimethoxy-biphenylene diisocyanate, 2,4-bis(b-isocyano-t-butyl)toluene, bis(para-b-isocyano-t-butylphenyl)ether, para-bis(2-methyl-4-isocyanophenyl)benzene, 3,3-diisocyano adamantane, 3,3-diisocyano biadamantane, 3,3-diisocyanoethyl- 1'-biadamantane, 1,2-bis(3-isocyano-propoxy)ethane, 2,2-dimethyl propylene diisocyanate, 3-methoxy-hexamethylene diisocyanate 2,5-dimethyl heptamethylene diisocyanate, 5-methylnonamethylene diisocyanate, 1,4-diisocyano-cyclohexane, 1,2-diisocyano-octadecane, 2,5-diisocyano-1,3,4-oxadiazole, OCN(CH$_2$)$_3$O(CH$_2$)$_2$O(CH$_2$)$_3$NCO, OCN(CH$_2$)$_3$NCO or the following:

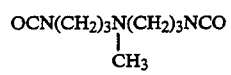

Aliphatic diisocyanates are preferred, forming urethanes that have excellent weatherability. One aliphatic diisocyanate that is particularly preferred is trimethyl hexamethylene diisocyanate.

A preferred polyester urethane is the reaction product of trimethylhexamethylene diisocyanate and a hydroxy terminated polyester of 1,3-butylene glycol, 1,6-hexanediol, adipic acid, trimethylolpropane, and Tone® FCP 310.

It is noted that a hydroxy functional polyester urethane can be converted to the corresponding acid functional polyester urethane by reaction with methylhexahydropthalic anhydride or other mono-anhydride such as succinic anhydride. Converting the hydroxy to the acid may result in longer pot life in the clearcoat.

A polyester may be prepared by conventional techniques in which the component polyols and carboxylic acids and solvent are esterified at about 110° C.–250° C. for about 1–10 hours to form a polyester. To form a polyester urethane, a diisocyanate may then be added and reacted at about 100° C. for about 15 minutes to 2 hours.

In preparing the polyester urethane, a catalyst is typically used. Conventional catalysts include benzyl trimethyl ammonium hydroxide, tetramethyl ammonium chloride, organic tin compounds, such as dibutyl tin diaurate, dibutyl tin oxide stannous octoate and the like, titanium complexes and litharge. About 0.1–5% by weight of catalyst, based on the total weight of the reactants, is typically used.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1 gram sample of the polyester. Additional information on the preparation of polyester urethanes is disclosed in commonly assigned U.S. Pat. No. 4,810,759, hereby incorporated by reference.

Another optional component are acrylic latices such as Neocryl® available from ICI. Other latices are available from ICI and Rohm & Haas. Another optional component are urethane dispersions or emulsions such as Neorez® 9699 and the like from ICI or Spensol L-52® from Reichold. Other suppliers are Witco, American Cyanamid, and Sanncor. The urethane dispersions can include polyethers, polyesters, polycarbonates, or mixtures thereof.

An acid resin is optionally added to the coating composition. The acid functional material can be formed by polymerizing monomers of alkyl methacrylates, or alkyl acrylates or mixtures thereof, where the alkyl groups have 1–12 carbon atoms and ethylenically unsaturated acids. Optionally, the acid functional polymer can also contain other components such as styrene, methyl styrene, and/or acrylonitrile, methacrylonitrile in amounts of about 0.1–50% by weight.

Typical alkyl acrylates, methacrylates, and other components that can be used to form the acid functional polymer are the same as those listed above with respect to the anhydride polymer.

Typically useful ethylenically unsaturated acids are acrylic acid, methacrylic acid, itaconic acid, maleic acid, and the like.

This acid resin may also contain hydroxyl functionality by using monomers such as hydroxyethylacrylate, hydroxyethyl methacrylate and hydroxypropyl acrylate. The hydroxy functionality may be introduced by a post reaction of the acid with epoxy containing compounds such as Cardura E® from Shell Chemical Company (a glycidyl ester of versatic acid) and propylene oxide.

Another optional component of the present composition is the half ester of an anhydride compound, as distinguished from a polymer, for example the reaction product of an acid anhydride such as hexahydropthalic anhydride or a succinic anhydride, which may be substituted, for example with a $C_1$–$C_8$ alkyl group, with a monofunctional or polyfunctional alcoholic solvent such as methanol or ethylene glycol. A preferred half ester is the reaction product of methylhexahydrophthalic anhydride and an alcohol such as ethylene glycol. Other alcoholic solvents are propanol, isobutanol, isopropanol, tertiary butanol, n-butanol, propylene glycol monomethyl ether, ethylene glycol monobutyl ether, and the like. The half ester is suitably present in the amount of 2 to 25 percent by weight of binder, preferably 4–12 percent.

About 0.1–5% by weight, based on the weight of the binder of the coating composition, of a catalyst is added to enhance curing of the composition. Typical catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, N,N,$N^1$,$N^1$-tetramethylethylenediamine, N-methyldiethanolamine, N,N-dimethyl- 1,3-propanediamine and 1-dimethylamino-2-propanol or quaternary ammonium salts such as tert-butyl ammonium bromide, benzyl trimethyl ammonium formate and the like. Preferred catalyst, however, are phosphonium compounds such as are disclosed in U.S. Pat. No. 4,906,677, hereby incorporated by reference in its entirety.

Typical solvents used to prepare the anhydride acrylic polymer or used as a diluent for the coating composition include toluene, xylene, butyl acetate, butyl proprionate, ethyl benzene, higher boiling aromatic hydrocarbons, amyl acetate, ethyl acetate, propyl acetate, ethylene or propylene glycol mono alkyl ether acetates.

The solvent for the final composition, as sold or applied, comprises primarily water. At least 60 percent of the liquid carrier, preferably 70 percent is water. Preferably deionized water is employed. Optional diluents for the water include butyl acetate, butyl proprionate, and butyl cellosolve.

Generally, the present composition is applied as a topcoat to a substrate by conventional techniques such as spraying and electrostatic spraying. The composition may be applied as a multi-package system. Multi-package means that at least some of the components are kept separate until shortly before their application. For instance, the glycidyl component must be kept separate from the half ester and optional acid components. The resulting coating can be dried and cured at elevated temperatures of 100° to 200° C. Coatings are applied to form a finish typically about 0.5–5 mils thick, and preferably 1–2 mils thick.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are listed in U.S. Pat. No. 4,906,677, previously incorporated by reference. Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[phenyldithiocarbamato]-Ni(II), and others listed in the above patent, column 8, line 44 through line 55.

An applicable blend of ultraviolet light stabilizers comprises 2-[2′-hydroxy-3′,5′-1(1-1-dimethyl-propyl)-phenyl]benzotrizole and bis-[4-(1,2,2,6,6-pentamethyl-piperidyl)]2-butyl-2-[(3,5-t-butyl-4-hydroxyphenyl)methyl]propanedioate. Although the stabilizers can be employed in any ratio, a 1:1 ratio of benzotriazole to propanedioate is preferred.

The present composition can be used over a waterborne basecoat which is pigmented to form a colored finish. Waterborne basecoats suitably comprise conventional pigments which can be added to an aqueous carrier by using conventional techniques in which a mill base containing pigment, dispersant and carrier is first formed. The mill base is then mixed with the composition to form a colored composition. This composition can be applied and cured as shown above. The liquid carrier in such waterborne basecoats are primarily water, preferably greater than 60 or 70 percent water.

During original automotive production, the present coating composition is applied over a waterborne basecoat and baked at conventional curing temperatures in the art, typically 265° F. Before applying the topcoat, however, the waterborne basecoat is typically dried using a warm-air flash or bake, without substantially curing the basecoat, in order to remove a substantial amount of the water. During baking, the half-esterified acid anhydride groups are believed to convert back to the original acid anhydride ring groups. These groups then react with the epoxy groups. A composition with a relatively faster acting epoxy crosslinker may be employ.

The present composition can be pigmented to form a colored finish such as a primer, basecoat, monocoat, or maintenance paint. About 0.1–200 percent by weight, based on the weight of the binder, of conventional pigments can be added using conventional techniques in which a mill base containing pigment, dispersant and carrier is first formed. The mill base is then mixed with the composition to form a colored composition.

The following examples illustrate the invention. All pans and percentages are on a weight basis unless otherwise indicated. The weight average molecular weight of polymers was determined by GPC (gel permeation chromatography) using polyethyl methacrylate as a standard, unless stated otherwise.

EXAMPLE 1

This example illustrates the preparation of a half ester of a maleic anhydride polymer, specifically the half ester of a styrene/isobornyl methacrylate/butyl acrylate/maleic anhydride copolymer. The anhydride polymer was first prepared, as follows. To a reactor, heated to reflux, equipped with a condensor, stirrer, nitrogen purge, feed system, heating mantle, were added, as Part I, 1384.86 parts of butylpropionate. The following Part II was premixed and then fed to the reactor over four hours. The next following Part III was added to the reactor over 30 minutes, held for 30 minutes.

|  | Parts by Weight |
|---|---|
| Part II | |
| Styrene monomer | 1081.92 |
| Isobornyl methacrylate | 735.71 |
| Butyl acrylate | 1773.05 |
| Maleic anhydride | 735.71 |
| Butyl propionate | 2077.29 |
| Tertiary butyl peroxyacetate | 259.66 |
| Part III | |
| Tertiary butyl peroxyacetate | 19.04 |
| Butyl proprionate | 138.00 |
| TOTAL | 8205.24 |

After the 30 minute holding period, a total of 1090 parts by weight of solvent is stripped off, resulting in a yield of 7115.24 parts by weight.

The product polymer had a Gardner-Holdt viscosity of V and a measured solids of 62.84%. The actual molecular weight was measured by gel permeation chromatography to be $M_n = 2355$ and $M_w = 6135$.

This maleic anhydride polymer was then coverted to a methyl half ester by mixing the following components:

| Components | Parts |
|---|---|
| Maleic anhydride polymer solution (prepared as described above) | 600 |
| Methanol | 24 |

The first component was heated to 50° C. and the methanol component added over a 20-30 minute period. The mixture was then heated to 75°-85° C. for five hours or until the anhydride band in the infrared analysis has disappeared (90-95% gone).

EXAMPLE 2

This example illustrates an epoxy silane polymer, more particularly an epoxy functional acrylosilane polymer which was prepared by charging the following constituents into a polymerization vessel equipped with a heating mantle, reflux condenser, thermometer, nitrogen inlet, and stirrer:

|  | Parts by Weight |
|---|---|
| Portion 1 | |
| Xylol (135–145° C.) | 363.2 |
| AROMATIC ™ 100 hydrocarbon solvent | 363.2 |
| Portion 2 | |
| Styrene | 530.9 |
| Gamma-Methacryloxypropyl trimethoxy silane | 1380.3 |
| Methyl methacrylate | 318.5 |
| Butyl methacrylate | 79.6 |
| 2-Ethylhexyl acrylate | 79.6 |
| Glycidyl methacrylate | 265.4 |
| AROMATIC ™ 100 hydrocarbon solvent | 40.9 |
| Xylol | 40.9 |
| Portion 3 | |
| t-Butyl peroxyacetate | 132.7 |
| AROMATIC ™ hydrocarbon solvent | 99.6 |
| Xylol | 99.7 |
| TOTAL | 3794.5 |

Portion 1 was charged into the polymerization vessel and heated under nitrogen to 149° C. Portion 2 was then added over 360 minutes and Portion 3 was added over 420 minutes to the vessel. The resulting polymer solution had the following characteristics:

| Gallon wt. (lbs/gal) | 8.56 |
|---|---|
| % wt. solids | 72.2 |
| % volume solids | 68.6 |
| $M_w$ of polymer | 5000 |
| $M_n$ of polymer | 1650 |

The polymer composition was, by weight, 20 percent styrene, 52 percent gamma-methacryloxylpropyl trimethoxy silane (A-174 from Union Carbide), 12 percent methyl methacrylate, 3 percent butyl methacrylate, 3 percent 2-ethylhexyl acrylae, and 10 percent glycidyl methacrylate, which may be represented as follows: STY/A-174/MMA/BMA/2-EHA/GMA in the ratio of 20/52/12/3/3/10.

EXAMPLE 3

This example illustrates a clearcoat composition according to the present invention, using a methyl half ester of maleic anhydride and an epoxy crosslinker. The following components were thoroughly blended:

| Part 1 | Parts by Weight |
|---|---|
| Methyl half ester of maleic anhydride acrylic polymer (as prepared above) | 27.0 |
| Deionized water | 59.8 |
| Triethyl amine | 2.7 |
| XU-71950 (Diglycidyl ester from Dow) | 6.4 |
| TINUVIN 1130 (UV screener) | 0.5 |
| Catalyst solution | 2.2 |
| TINUVIN-123 (25%) in butyl cellosolve | 1.4 |

In the above list, the catalyst solution refers to a solution of benzyl triphenyl phosphonium chloride (10%) in isopropanol. The TINUVIN-123 is a hindered amine; both TINUVINs are commercially available from Ciba-Geigy.

The coating composition was sprayed onto primed metal panels coated with a waterborne basecoat and cured at 265° F. The coating exhibited excellent humidity resistance, chemical resistance, durability and other film properties.

EXAMPLE 4

This example illustrates, as an optional component for a composition according to the present invention, a polyester urethane solution which may be prepared by charging the following constituents in order into a reaction vessel equipped with a stirrer, a heating source and a reflux condenser:

|  | Parts by Weight |
| --- | --- |
| Portion 1 | |
| 1,3-butylene glycol | 173.4 |
| 1,6-hexanediol | 163.1 |
| Trimethylol propane | 78.8 |
| Adipic acid | 403.7 |
| Toluene | 20.0 |
| Portion 2 | |
| Propylene glycol monomethyl ether acetate | 294.4 |
| Portion 3 | |
| Tone ® FCP 310 (caprolactone polyol from Union Carbide) | 934.9 |
| Propylene glycol monomethyl ether acetate | 185.3 |
| Hydrocarbon solvent | 706.1 |
| Portion 4 | |
| trimethylhexamethylene diisocyanate | 290.3 |
| dibutyl tin dilaurate | 0.5 |
| Portion 5 | |
| Hydrocarbon solvent | 69.8 |
| Total | 3320.3 |

Portion 1 is charged in order into the reaction vessel, and the constituents of Portion 1 are heated to distill water at 140°-230° C. The distillation is continued until the acid number is 6.5 to 8.5. The product is thinned and cooled to 98° to 102° C. by charging Portion 2 into the vessel. While the constituents in the vessel are maintained at the above temperature, Portion 3 was charged to the reactor in order. Portion 4 is added to the composition at a uniform rate over a 30 minute period while the batch temperature is maintained at 98°-102° C. A sample is removed and tested for unreacted isocyanate NCO by infrared analysis. The composition is held at the above temperature until there is no unreacted isocyanate in the composition. Portion 5 then is added as a rinse and the resulting composition was allowed to cool to ambient temperatures.

Following this procedure, the resulting composition had a polymer weight solids content of about 61.0%. The polyester urethane had a Gardner-Holdt viscosity of L. The $M_n$ (number average molecular weight) was 3734.0 and the $M_w$ (weight average molecular weight) was 7818.0 (by gel permeation chromatography using polystyrene as the standard). The acid content was determined to be 4.9 Meq/g. The hydroxy number was 92.

EXAMPLE 5

This example illustrates, as another optional component for use in the present composition, an acid polymer, more specifically a methacrylic acid resin, which may be prepared by charging the following constituents into a reactor equipped with a thermometer, stirrer, dropping funnel, and condenser:

|  | Parts by Weight |
| --- | --- |
| Portion 1 | |
| Propylene glycol monomethyl ether acetate (hereafter PM acetate) | 155.3 |
| Xylene | 103.5 |
| Portion 2 | |
| Butyl methacrylate | 174.8 |
| Methacrylic acid | 97.1 |
| Butyl acrylate | 140.8 |
| Styrene | 72.8 |
| Portion 3 | |
| Tertiary butyl peroxy acetate | 35.0 |
| PM acetate | 41.7 |
| Xylene | 27.8 |
| Total | 849.0 |

Portion 1 was charged into the reactor and heated to reflux (approximately 140° C.). Portion 2 was premixed and added to the reactor dropwise over a 240 minute period. Portion 3 was premixed and added to the reactor over a 270 minute period concurrent with Portion 3. After the addition was complete, the reactor was held at reflux and filled out.

The resulting acid polymer composition had a composition of 15% styrene, 36% butyl methacrylate, 29% n-butyl acrylate, and 20% methacrylic acid. The solids content was 60% and the polymer had a Gardner-Holdt viscosity of Z-1. The polymer had a weight average molecular weight of 5000.

EXAMPLE 6

This example illustrates another clearcoat composition according to the present invention, using a methyl half ester of maleic anhydride and an epoxy crosslinker, but also with a silane component. The following components were thoroughly blended:

| Part 1 | Parts by Weight |
| --- | --- |
| Methyl half ester of maleic anhydride acrylic polymer (as prepared above) | 17.79 |
| Deionized water | 68.02 |
| Triethyl amine | 1.94 |
| XU-71950 (Diglycidyl ester from Dow) | 4.22 |
| Epoxy silane polymer (as prepared above) | 3.95 |
| TINUVIN 1130 (UV screener) | 0.4 |
| TINUVIN 123 (25% in butyl cellosolve) | 1.05 |
| Catalyst solution | 1.71 |
| Butyl cellosolve | 0.92 |
| TOTAL | 100 |

In the above list, the catalyst solution refers to a solution of benzyl triphenyl phosphonium chloride (10%) in isopropanol. The TINUVIN 123 is a hindered amine commercially available from Ciba-Geigy.

This clear is adjusted to spray at 32 sec in a #2 Zahn cup with deionized water. The pH equals 9.2. The clear is sprayed over a waterborne basecoat and cured at 265°-285° F. for 30 minutes. The resulting films were hard, glossy, and resistant to solvent and humidity. These films are durable and environmentally resistant.

Various modifications, alterations, additions, or substitutions of the components of the composition of this invention will be apparent to those skilled in the art without departing from the scope and spirit of this invention. This invention is not limited to the illustrative embodiments set forth herein, but rather the invention is defined by the following claims.

We claim:

1. A coating composition for a clearcoat, applied as a multi-package system, comprising 20–80% by weight of reactive binder components and 80–20% by weight of an aqueous liquid carrier having greater than 60% by weight water; wherein the reactive binder comprises:
   (a) 25–90% by weight, based on the weight of the binder, of a half-ester product of an acrylic copolymer having at least two reactive anhydride groups and comprising polymerized monomers of an ethylenically unsaturated anhydride or an ethylenically unsaturated dicarboxylic acid, which has been converted to an anhydride, and polymerized monomers selected from the group consisting of alkyl methacrylate, alkyl acrylate and any mixtures thereof, wherein the alkyl groups have 1–8 carbon atoms and the polymer has a weight average molecular weight of about 2,000–100,000, wherein equal or greater than 90% of the anhydride groups on said acrylic copolymer has been half-esterified by reaction with an alcohol;
   (b) 5–50% by weight, based on the weight of the binder, of a glycidyl ether or ester or cycloaliphatic epoxy compound containing at least two reactive glycidyl groups;
   (c) an effective amount of a base for neutralizing the half ester product of (a) above; and
   (d) 0.1–5% by weight, based on the weight of binder, of a curing catalyst; wherein the multipackage system comprises keeping components (a) and (b) separate until shortly before their application.

2. The coating composition of claim 1, wherein the base is a volatile amine to solubilize or disperse the half ester product into the aqueous liquid carrier.

3. The coating composition further comprising butyl cellosolve.

4. The coating composition of claim 1, wherein the glycidyl component comprises a di- or polygylcidyl ether of a polyol or a di- or polyglycidyl ester of a di- or polycarboxylic acid.

5. The coating composition of claim 1 in which the glycidyl component is selected from the group consisting of a polyglycidyl ether of low molecular weight polyol, an epoxy resin of epichlorohydrin and bisphenol A, a polyglycidyl ester of polycarboxylic acid, a polyglycidyl ether of isocyanurate, a glycidyl methacrylate or glycidyl acrylate containing acrylic polymer, and mixtures of any of the above.

6. The coating composition of claim 1, further comprising a polyester urethane, an acrylic latex, a waterborne urethane emulsion or dispersion, and mixtures thereof.

7. The coating composition of claim 1, in which the half ester product is an acrylic polymer comprising polymerized monomers of styrene, alkyl methacrylates and/or alkyl acrylates having 2–4 carbon atoms in the alkyl group, and the half ester of an ethylenically unsaturated anhydride or ethylenically unsaturated dicarboxylic acid which has been converted to an anhydride.

8. The coating composition of claim 1 in which component (a) is the half ester product of an anhydride functional acrylic copolymer comprising polymerized monomers of alkyl acrylate and/or alkyl methacrylate, each alkyl having 1–12 carbon atoms, and itaconic acid, the latter dehydrated to the anhydride following polymerization.

9. The composition of claim 1, wherein the polyester urethane is the reaction product of a hydroxyl terminated polyester and a polyisocyanate.

10. The coating composition of claim 1, in which the polyester urethane has an acid number of 20 to 120.

11. The coating composition of claim 1, further comprising an acid functional polymer formed by polymerizing monomers of alkyl methacrylates or alkyl acrylates or hydroxy alkyl acrylates or hydroxy alkyl methacrylates or mixtures thereof, where the alkyl groups have 1–12 carbon atoms and ethylenically unsaturated acids.

12. The coating composition of claim 1, in which the catalyst is a phosphonium compound.

13. The coating composition of claim 1, further comprising a half ester, in addition to component (a), which is the reaction product of a alcohol or glycol and a monomeric anhydride of a dicarboxylic acid.

14. A substrate coated with a cured layer of the composition of claim 1.

* * * * *